United States Patent [19]

Hähn et al.

[11] Patent Number: 5,584,601

[45] Date of Patent: Dec. 17, 1996

[54] PROCESS FOR PRODUCTION OF CUT-OFF WALLS

[75] Inventors: Reinhard Hähn, Vilsheim; Norbert Schall, Langenpreising, both of Germany

[73] Assignee: Sud-Chemi AG, Munich, Germany

[21] Appl. No.: 450,232

[22] Filed: May 25, 1995

[30] Foreign Application Priority Data

May 27, 1994 [DE] Germany .......................... 44 18 629.0

[51] Int. Cl.$^6$ ...................................... E02D 29/02
[52] U.S. Cl. ............................ 405/30; 405/270; 405/284
[58] Field of Search ................................. 405/33, 70, 128, 405/129, 264, 268, 270, 258, 303, 284, 285

[56] References Cited

U.S. PATENT DOCUMENTS

| | | | |
|---|---|---|---|
| 3,924,412 | 12/1975 | Bennett et al. | 405/70 X |
| 4,048,373 | 9/1977 | Clem | 428/454 |
| 4,103,499 | 8/1978 | Clem | 61/50 |
| 4,412,018 | 10/1983 | Finlayson et al. | 523/508 |
| 4,434,076 | 2/1984 | Mardis et al. | 252/315.2 |
| 4,467,015 | 8/1984 | Clem | 405/263 X |
| 4,473,477 | 9/1984 | Beall | 210/691 |
| 4,517,112 | 5/1985 | Mardis et al. | 252/315.2 |
| 4,565,468 | 1/1986 | Crawford | 405/270 |
| 4,601,615 | 7/1986 | Cavalli | 405/267 |
| 4,787,780 | 11/1988 | Harriett | 405/270 |
| 4,808,039 | 2/1989 | Fischer | 405/281 |
| 4,981,762 | 1/1991 | Athey | 405/128 X |
| 4,992,003 | 2/1991 | Perach | 405/258 |
| 5,106,233 | 4/1992 | Breaux | 405/128 |
| 5,141,362 | 8/1992 | Kugler | 405/128 |
| 5,173,344 | 12/1992 | Hughes | 405/107 X |
| 5,322,581 | 6/1994 | Heerten | 156/148 |
| 5,336,647 | 8/1994 | Nae et al. | 501/146 |
| 5,360,293 | 11/1994 | Breaux et al. | 405/128 X |
| 5,388,931 | 2/1995 | Carlson | 405/274 |

FOREIGN PATENT DOCUMENTS

| | | |
|---|---|---|
| 3504119 | 8/1986 | Germany . |
| 3605252 | 8/1987 | Germany . |
| 4221329 | 1/1994 | Germany . |

*Primary Examiner*—Roger J. Schoeppel
*Attorney, Agent, or Firm*—Scott R. Cox

[57] ABSTRACT

A process for production of cut-off walls, characterized by the fact that a geotextile-smectite mat that contains a water-swellable smectite is introduced to a not yet hydraulically set cut-off wall composition.

A further object of the invention is a geotextile-smectite mat in web form, characterized by the fact that it contains a sealing layer of water-swellable smectite between two geotextile layers and has a locking mechanism on each side edge for tight joining of the web to another web that has a complementary locking mechanism on each side edge.

11 Claims, 1 Drawing Sheet

PROCESS FOR PRODUCTION OF CUT-OFF WALLS

BACKGROUND OF INVENTION

The invention concerns a process for construction of cut-off walls, as well as geotextile mats.

Vertical cut-off walls produced in the ground are used as watertight soil enclosures, as cutoff walls in retaining dams and as bank protection in water bodies.

Since the late 1970s vertical cut-off walls have also been used as casings for originally unsealed waste disposal sites. The essential function of a cut-off wall is to interrupt ground water flow. In this fashion the discharge of pollutants from waste disposal sites is interrupted and seepage is contained within said sites.

Cut-off walls are introduced, for example, in a trench wall process (one-phase process or two-phase process). In the two-phase process, excavation initially occurs using a bentonite/water suspension as liquid. After the final depth for the cut-off wall is reached, the bentonite suspension is replaced by the cut-off wall composition, which forms the cut-off wall after hydraulic setting.

In the one-phase process the support liquid is simultaneously the cut-off wall composition. A suspension of water-swellable bentonite (about 30–60 kg/m$^3$), cement (about 150–300 kg/m$^3$) and water (about 650–950 kg/m$^3$) is used as the cut-off wall composition. Excavation of the cut-off wall occurs with this suspension. After the final depth is reached, the supporting liquid/cut-off wall composition remains in the trench and sets hydraulically (David Urban, Vertical Sealing of Landfills and Contaminated Soils, BBR 3/93, Vol. 44, p. 102 ff).

By design the cut-off walls so produced exhibit very limited water permeability. The so-called combination cut-off walls were developed to reduce water permeability and also permeation of pollutants through the cut-off wall. In this case HDPE sheets (high-density polyethylene) are introduced vertically into the cut-off wall composition before it hydraulically sets. Joining of the individual webs occurs via locking mechanisms that are optionally sealed with additional sealing composition. In this fashion the cut-off wall is sealed over the entire surface by a water-impermeable HDPE sheet.

DE-C-3 605 252 describes a trench wall for vertical sealing of liquid-conducting and/or gas-conducting layers with a trench cut into the ground down to an impermeable horizontal layer. The trench is filled with a composition, like bentonite, and with a seal immersed in that composition composed of several water-impermeable sealing webs that can be joined at the contact points by a locking mechanism consisting of two hook-shaped interlocking parts.

DE-A-3 504 119 describes trench walls with sealing webs that are joined via locking elements (tubes fit into each other).

EP-B-0 278 343 describes a device for joining sealing sheets which is incorporated into a cut-off wall. The sealing sheets consist of liquid-impermeable plastic tightly joined via a special locking mechanism.

Ensuring mechanical integrity of the film after incorporation is problematical in these references and the long-term stability of the plastic sealing web is also questionable.

A requirement therefore exists for an additional sealing element in which mechanical damage that can occur during incorporation of the webs can be limited. In addition, this type of sealing element must be stable for longer periods of time than conventional sealing elements.

DE-A-4 221 329 describes bentonite geotextile mats that contain outlet slits for water-swollen bentonite in their edge regions where the mats are superimposed during production. The emerging bentonite produces tight seals between the mats in the regions of overlap. However, the sealing mats are not used to produce cut-off walls, but for horizontal sealing of landfills. In addition, they contain no locking mechanism to join one web to another web.

U.S. Pat. No. 5 173 344 describes the tight joining of bentonite geotextile mats. These are laid out to overlap, such that a cylindrical strand, consisting of bentonite enclosed by a polyester fabric, is introduced in the region of overlap. On entry of water the bentonite present in the strip swells, causing the enclosure to burst. The bentonite is distributed in the region of overlap, during which the sealing webs are supposed to be joined tightly together. Tight joining, however, is not guaranteed if the mats are exposed to tensile forces. In particular, these mats are not suitable for introduction vertically as tensile forces act between the individual webs during insertion.

U.S. Pat. No. 4 565 468 discloses a bentonite geotextile mat for horizontal application in which the individual webs are joined by a type of adhesive film. The sealing effect, however, is not guaranteed as the adhesive film does not possess adequate strength under mechanical stress, which can occur during introduction of the mats into the vertical cut-off walls.

U.S. Pat. No. 4 048 373 describes a sealing panel that contains a bentonite layer between two paper board layers in which salts of phosphoric acid, boric acid and acetic acid, supplemented by water-soluble polymers, are contained. This panel is not a bentonite geotextile mat used for incorporation vertically in cut-off walls. Further, the individual panels cannot be rigidly joined.

A bentonite panel is disclosed by U.S. Pat. No. 4 103 499 in which salts of acetic acid, phosphoric acid or boric acid, and optionally hydrophilic polymers, are contained in the bentonite layer. Addition of these salts is designed to improve tightness for salt-containing liquids. However, the panel cannot be used for incorporation in trench walls because no locking mechanisms are provided on the side edges.

A composite mat, especially for rock, dam and landfill construction is disclosed by DE-U-9 400 650. It essentially consists of strips of synthetic or natural fibers forming a lattice mat woven together in the fashion of warp and weft threads and at least one coating that can be joined to the lattice mat. The lattice mats have reinforcements in some places and along the edge region of the lattice mat. The coating is designed as a joining element. However, the composite mat serves only to support regions threatened by erosion and has no sealing effect.

The objective of the invention is thus to devise a process for production of cut-off walls that represent a barrier against penetration of liquids, in which the sealing element is also plastically deformable.

DESCRIPTION OF THE INVENTION

It is surprisingly found that the tightness of cut-off walls can be improved by introducing a geotextile mat to a still not hydraulically set cut-off wall mat suspension that contains water-swellable smectite between the geotextile layers.

Geotextile layers, which can be designed as a fabric or nonwoven material, are understood to mean layers of undegradable or poorly degradable plastic fibers, for example polypropylene, polyethylene, polyvinyl chloride or polyamides (in contrast to readily degradable textile materials, like cotton, cellulose, etc.). A sorption and sealing layer with a thickness of about 2 to 5 mm of water-swellable smectite (powder or granules) is introduced between the geotextile layers. The smectite can be fixed between the geotextile layers by an adhesive (for example glue) or by stitching of the geotextile layers, whereby the mechanical stability is also improved during insertion.

The smectite swells with the water contained in the suspension. Swelling occurs against the mechanical resistance that develops during the setting of the suspension of the cut-off wall composition so that a layer of swollen smectite is situated in the cut-off wall composition, which further improves water tightness. This additional sealing element can adjust to mechanical distortions in the cut-off wall because of its plasticity, can "heal" mechanical damage of the bentonite mat that occurs during incorporation because of the swelling action and, in addition, has the required long-term stability. The swellable smectite used to produce the geotextile mat is chosen so that it exhibits good swelling properties even with an excess of calcium ions occurring in the cement suspensions.

The water-swellable smectites are preferably chosen from a group selected from montmorillonite, beidellite, hectorite and saponite. The ion exchange capacity should be at least about 30 meq (milliequivalents).

The water-swellable smectite can be admixed with an organophilic smectite in which the weight ratio between the water swellable smectite and the organophilic smectite would be about 99:1 to 80:20.

The organophilic smectite is the reaction product of an inorganic smectite, preferably a water-swellable smectite, with a cationic organic compound, preferably a quaternary ammonium compound. The amount of organic cation required for conversion should amount to between 30 and 120 meq. of inorganic smectite.

The object of the invention is also a geotextile mat in web form which contains a sealing layer of water-swellable smectite between two geotextile layers and has a locking mechanism for tight joining of the two webs on the side edges.

Incorporation of the geotextile mat webs into the trench wall filled with the suspension of the cut-off wall composition occurs with systems similar to those used during incorporation of HDPE films, i.e., two or more geotextile mats are joined together at the lateral locking mechanisms and lowered into the suspension on a mounting frame.

The locking mechanism preferably has profiles attached to the side edges of the webs, in which the profiles of one web mesh with the profiles of the other web. The profiles are preferably made by extrusion of a thermoplastic material, such as polypropylene, so as to be heat sealable with the geotextile layers. See FIGS. 1, 2 and 3.

The profiles of the mats can be (a) self-sealing or (b) sealable with a sealant.

Some practical examples of geotextile mats with locking mechanisms are explained below with reference to the attached figures wherein.

Figure 1:
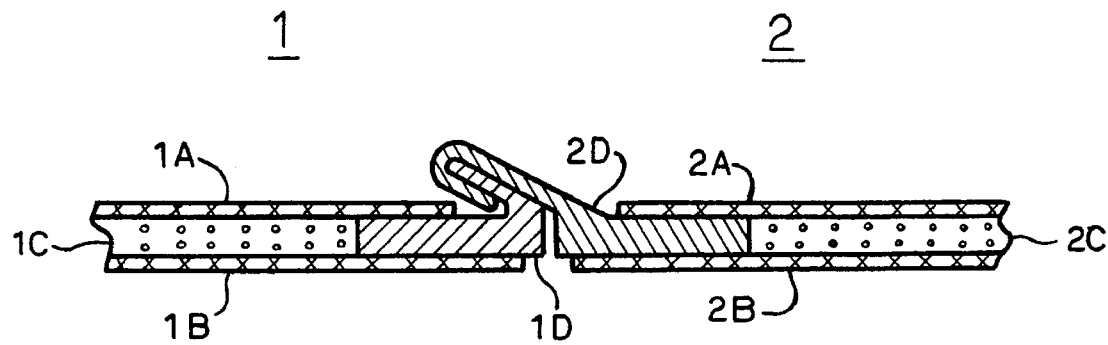
FIG. 1 shows a horizontal section through a joining site between two sealing mat webs with a locking mechanism with hook-shaped profiles.

In a preferred embodiment of FIG. 1 two geotextile smectite mats 1 and 2 are joined together, each of which has two outer geotextile layers 1a and 1b or 2a and 2b of polypropylene nonwoven fabric. A roughly 3–5 mm thick layer 1c or 2c of water-swellable smectite is situated between the geotextile layers, which is joined to the outer geotextile layers by means of an adhesive. The geotextile layers are stitched together (not shown). The complementary hook-shaped plastic profiles 1d or 2d are inserted into the side edge region of the two mats and preferably also consist of polypropylene so that they can be sealed to the geotextile layers 1a and 1b or 2a and 2b. The other, left edge region of mat 1 (not shown) contains a corresponding profile in which either a profile corresponding to 1d or corresponding to 2d can be inserted between the geotextile layers 1a and 1b. The right edge region of mat 2 is correspondingly provided with hook-shaped plastic profiles between geotextile layers 2a and 2b (not shown).

During incorporation the mats 1 and 2 are joined at the hook-shaped profiles 1d and 2d. When the profiles match precisely the seal is tight. However, a sealing composition (for example, a cut-off wall suspension consisting of smectite and cement) is preferably introduced between profiles 1d and 2d.

Figure 2:
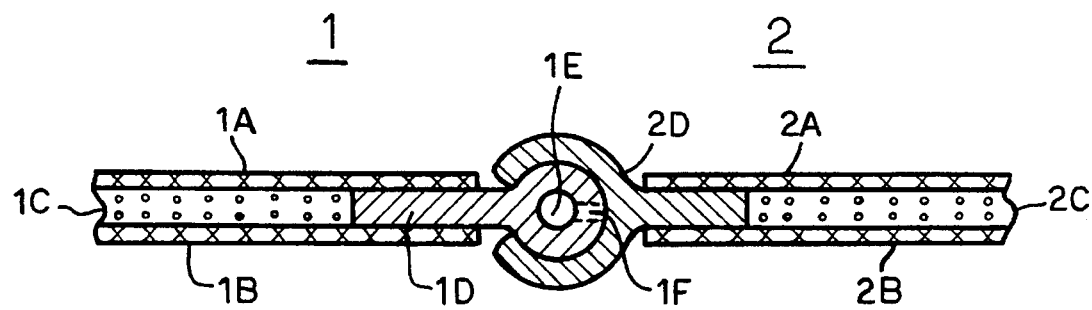
FIG. 2 shows a first alternative embodiment showing a horizontal section through a joining site between two sealing mat webs with a locking mechanism with round overlapping profiles.

In a first alternative preferred embodiment according to FIG. 2 two geotextile smectite mats 1 and 2 are joined, which, as in the variant of FIG. 1, each contain a smectite layer 1c or 2c between two stitched geotextile layers 1a and 1b or 2a and 2b. The plastic profiles 1d or 2d are inserted in the smectite-free edge region between the geotextile layers 1a and 1b or 2a and 2b and sealed to these layers. The plastic profile 1d is widened on the end to form a bulge and contains a hole 1e, as well as a lateral opening If emerging from this hole on the lower end of the profile (when the mat is lowered).

A plastic profile 2d that forms an open tube on the outer end, which meshes as tightly as possible with the end bulge of profile 1d, is inserted into the edge region of geotextile smectite mat 2 consisting of the geotextile layers 2a and 2b and the smectite layer 2c.

Either a sealing profile 1b or 2d can be inserted into the other (not shown) edge regions of mats 1 (left) and 2 (right), in which the sealing profiles are designed complementary to the additional webs adjoining the other edge regions. The mats 1 and 2 can be joined either by snapping profiles 1d and 2d into place or pushing them together. During incorporation of the sealing mats a sealing composition can be injected downward through hole 1e, which penetrates via opening 1f from the bottom up into the intermediate space between the end bulge of profile 1d and the end part of profile 2d of mat 2.

Figure 3:
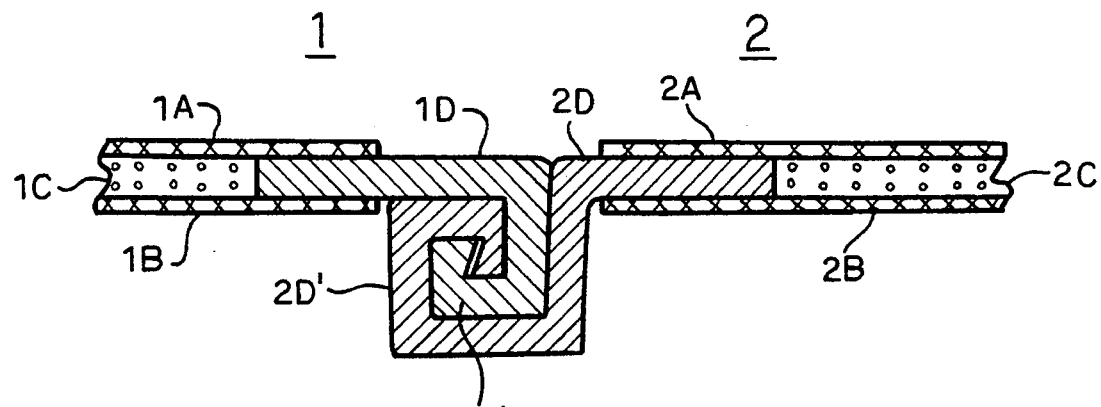
FIG. 3 shows a second alternative embodiment showing a horizontal section through a joining site between two sealing mat webs with a locking mechanism with two angular overlapping profiles.

A second alternative preferred embodiment according to FIG. 3 essentially corresponds to the embodiment of FIG. 2 in which the same elements are denoted with the same reference numbers. The angled sealing profiles 1d and 2d mesh with each other with their corresponding protrusions 1d' and 2d'. Mats 1 and 2 are joined by pushing profiles 1d and 2d together. As in the variant according to FIG. 2, the profile joints can be sealed with a sealing mass.

The invention is explained by the following examples.

EXAMPLE 1

(Comparison)

30 g of cement-stable, water-swellable sodium bentonite ("TIXOTON"CV 15; manufacturer Sud-Chemie AG) was initially dispersed for 20 minutes at 2800 rpm in 933 g of water with a high-speed agitator. The suspension was held for 24 hours for swelling. After 25 hours 175 kg of blast furnace cement was added in a second mixing process. The mixing time was 10 minutes.

The bentonite cement suspension was then poured into cylindrical sample containers with an inside diameter of 10 cm and a height of 10 cm and allowed to harden for 14 days. The hardened samples were introduced to a triaxial cell according to DIN 18130 and permeated with distilled water under a hydraulic gradient of i=30. A permeability coefficient (k) of $7.0 \cdot 10^{-7}$ m/s was found.

EXAMPLE 2

(Invention)

Production of the cut-off wall composition occurred in similar fashion to Example 1. To produce the molded articles small protrusions were made on the inside of the hollow cylinder to position a circular-cutout geotextile bentonite mat.

The hollow shape was filled up to the protrusions with the bentonite cement suspension, whereupon the dressed, cut to size geotextile bentonite mat was inserted. This contained a roughly 3 mm thick layer of cement-stable, water-swellable sodium bentonite ("TIXOTON" CV 15) between two layers of polypropylene nonwoven fabric. The bentonite layer was fixed to the polypropylene nonwoven layers with an adhesive.

The hollow cylinder was then filled with bentonite-cement suspension. The molded articles were then stored according to Example 1 for 14 days under water, whereupon the water permeability coefficient (k) was measured across the geotextile mat according to Example 1.

Result: $k=9.1 \cdot 10^{-9}$ m/s.

EXAMPLE 3

(Invention)

The procedure of Example 2 was repeated, with the deviation that a mixture of 20 wt. % organophilic bentonire ("TIXOSORB", manufacturer Sud-Chemie AG) and 80 wt. % water-swellable bentonire ("TIXOGEL", CV 15) was used.

After setting of the cement suspension an aqueous phenol solution containing 100 ppm phenol was filled into the hollow cylinder. The permeability coefficient k was $9.8 \cdot 10^{-9}$ m/s. Over a test period of 20 days no phenol could be detected in the permeate according to the HPLC (high performance liquid chromatography) method (detection limit—20 ppm phenol).

EXAMPLE 4

(Invention)

Two geotextile-bentonite mats with locking mechanisms according to the variant of FIG. 2 were produced, which were bent into semicircles and joined into a hollow cylinder by pushing together profiles 1d and 2d. Each mat had a length of 75 cm and a height of 55 cm. The roughly 3 mm bentonite layer 1c, 2c (Tixoton® CV 15) was joined to the polypropylene nonwoven layers 1a and 1b or 2a and 2b with an adhesive. The mats were also stitched.

The intermediate spaces between the mats were sealed through openings 1e and 1f by injecting a cement-bentonite dispersion. The hollow cylinder was placed for about 12 hours in water so that the bentonite could swell, whereupon the hollow cylinder was placed in a trough with a diameter of 60 cm that contained a roughly 10 cm thick layer of sodium bentonite with a water content of 40%. The hollow cylinder extended about 5 cm into the bentonite, which was pressed against the nonwoven layers of the mats so that a tight bottom closure was guaranteed. The hollow cylinder was then filled to the upper edge with water. After a standing time of 24 hours at a pressure of 50 cm $H_2O$ no penetration of water to the outside wall of the hollow cylinder could be established.

We claim:

1. A process for production of cut-off walls comprising
   (a) incorporating a water-swellable smectite between geotextile layers of a geotextile mat to form a modified geotextile mat wherein the geotextile mat form webs, each of which contains lateral locking mechanisms,
   (b) introducing the webs into a not yet hydraulically set, cut-off wall composition, and
   (c) securing the webs together in place by use of the lateral locking mechanisms to produce a cut-off wall.

2. The process of claim 1, wherein the water-swellable smectite is selected from the group consisting of montmorillonite, beidellite, hectorite or saponite.

3. The process of claim 1, wherein an organophilic smectite is admixed with the water-swellable smectite in a weight ratio between the water-swellable smectite and the organophilic smectite from about 99:1 to 20:80.

4. A geotextile-smectite mat in web form for use in cut-off walls comprising a sealing layer of a water-swellable smectite between geotextile layers and a locking mechanism on side edges thereof for tight joining of a first web with a second web that has a complementary locking mechanism on its side edge.

5. The mat of claim 4 wherein the locking mechanism comprises a pair of cooperating, angled protrusions which operate together to connect the first web with the second web.

6. The mat of claim 4, wherein the locking mechanism has profiles positioned on the side edges of the webs in which the profiles of one web mesh with the profiles of the other web.

7. The mat of claim 4, wherein the profiles are self-sealing.

8. The mat of claim 4, wherein the profiles are sealable with a sealant.

9. The mat of claim 4, wherein the locking mechanism comprises a hook-shaped section and a corresponding extension section, which operates in conjunction with the hook-shaped section to connect the first web with the second web.

10. The mat of claim 4 wherein the locking mechanism comprises a bulge section and a corresponding tubular section, which operates in conjunction with the bulge section to connect the first web with the second web.

11. The mat of claim 10 wherein the tubular section contains an opening extending downward through the tubular section.

* * * * *